(12) United States Patent
Mulligan et al.

(10) Patent No.: US 12,254,326 B1
(45) Date of Patent: Mar. 18, 2025

(54) SYSTEMS AND METHODS FOR TRANSFERRING DATA BETWEEN INDUSTRIAL DATA POLLING SYSTEMS AND EVENT-BASED FIELD DEVICES

(71) Applicant: Applied Information, Inc., Suwanee, GA (US)

(72) Inventors: Bryan Patrick Mulligan, Suwanee, GA (US); Iain Jeffrey Mulligan, Alpharetta, GA (US); Kyle Williams, Cape Town (SA)

(73) Assignee: Applied Information, Inc., Suwanee, GA (US)

( * ) Notice: Subject to any disclaimer, the term of this patent is extended or adjusted under 35 U.S.C. 154(b) by 80 days.

(21) Appl. No.: 18/298,119

(22) Filed: Apr. 10, 2023

(51) Int. Cl.
*G06F 9/445* (2018.01)
*G16Y 20/40* (2020.01)

(52) U.S. Cl.
CPC .......... *G06F 9/44505* (2013.01); *G16Y 20/40* (2020.01)

(58) Field of Classification Search
CPC ............................. G06F 9/44505; G16Y 20/40
See application file for complete search history.

(56) References Cited

U.S. PATENT DOCUMENTS

| | | | | |
|---|---|---|---|---|
| 2006/0240818 A1* | 10/2006 | McCoy | ............. | H04B 7/18567 |
| | | | | 455/430 |
| 2007/0156253 A1* | 7/2007 | De Silvio | ............ | G05B 19/056 |
| | | | | 700/6 |
| 2019/0204467 A1* | 7/2019 | Curt | ......................... | E21B 47/13 |
| 2020/0157922 A1* | 5/2020 | Stout | ........................ | E21B 47/13 |
| 2023/0004145 A1* | 1/2023 | Kang | ................. | G05B 19/4155 |
| 2023/0407863 A1* | 12/2023 | Neff | ...................... | F04D 27/001 |
| 2024/0175736 A1* | 5/2024 | Redmond | ............. | G01F 15/063 |

* cited by examiner

*Primary Examiner* — Nimesh G Patel
(74) *Attorney, Agent, or Firm* — Morris, Manning & Martin, LLP; Daniel E. Sineway, Esq.; Daniel T. Begasse, Esq.

(57) ABSTRACT

The disclosed technology includes systems and methods for receiving field data associated with industrial equipment from one or more field devices operating under an event-based data transmission schema to, storing the field data at a remote computing system, receiving a request for the field data from an industrial data polling system operating under a polling protocol, and transmitting the field data, from the remote computing system and to the industrial data polling system, as a polling protocol reply.

17 Claims, 6 Drawing Sheets

Device ID: 20128

| General | Industrial System 1 |

Time Since Last Contact: # Days, # Hours, # Seconds, MM/DD/YY HH:MM:SS AM/PM

Logic Table Update Timestamp: MM/DD/YY HH:MM:SS AM/PM

320 — Outputs  316 — Logic Table  318 — PID Control  322 — Hour Meter

[Refresh]

| | IF | | | THEN | | | |
|---|---|---|---|---|---|---|---|
| Row | Input(N) | Logic Operator | Input Value | Output(M) | Value | Comment | New Row |
| 1 | Digital Input(1) | Equal | True(0) | Digital Output(1) | True | On | Edit/Delete |
| 2 | Digital Input(1) | Equal | False(0) | Digital Output(1) | False | Off | Edit/Delete |

324

[Save] — 314    [Save & Publish] — 326

FIG. 3B

SYSTEMS AND METHODS FOR TRANSFERRING DATA BETWEEN INDUSTRIAL DATA POLLING SYSTEMS AND EVENT-BASED FIELD DEVICES

TECHNICAL FIELD

The present systems and methods relate generally to field devices, and more particularly to remotely managing and updating computer implementable operational logic on field devices.

BACKGROUND

Several industries (e.g., oil drilling) involve operations at remote locations, and those operations can be largely automated. Often, such industrial applications utilize one or more field devices that include or are in communication with sensors, and the field devices can communicate measured data to a central system. In some cases, the field devices can control operation of machinery at the remote location. In any case, such systems typically use a supervisory control and data acquisition ("SCADA") control system architecture. Traditional SCADA systems are generally configured to have direct access to field devices.

Increasingly, it is becoming useful to integrate operations systems with cloud computing services, particularly with the advent of internet of things ("IoT") devices, which can include the field devices used at remote industrial locations. For example, field devices in communication with remote industrial systems equipment can include, or be retrofitted to include, IoT device configuration logic. Unfortunately, traditional SCADA systems are generally configured to have direct access to (e.g., directly communicate with) field devices, and inserting cloud computing services between that direct access lengthens the communication chain along which messages must travel, which can increase latency. Stated otherwise, traditional SCADA systems are typically unable to be efficiently integrated with cloud computing services. Moreover, this problem is exacerbated given SCADA systems generally communicate via a polling protocol (e.g., the Modbus communication protocol) which, when combined with the lengthened communication chain mentioned above, can strain a network's bandwidth capacity due to an increase in overall network traffic.

Therefore, there exists a long-felt but unresolved need for systems and methods for remotely managing and updating IoT device configuration logic, namely IoT device configuration logic in industrial systems equipment while reducing overall network traffic and/or shortening the necessary communication chain required to remotely manage and update the IoT device configuration logic.

BRIEF SUMMARY

Briefly described, aspects of the present disclosure generally relate to systems and methods for responding to polling data requests from industrial data polling systems using traditional polling protocols with data obtained by internet of things ("IoT") devices using event-based data transmission protocols configuration logic. For example, the disclosed technology includes systems and methods for receiving field data from one or more IoT devices (e.g., field devices), storing the field data in a memory cache, receiving a polling request for particular field data, retrieving the particular field data based on data included in the polling request, reformatting the particular field data to a polling protocol reply, and transmitting the polling protocol reply to the industrial data polling system.

The disclosed technology includes a system comprising (i) a remote computing system comprising a processor and memory and (ii) one or more field devices physically proximate to industrial equipment. Each of the one or more field devices being configured to obtain field data by monitoring one or more parameters associated with the industrial equipment and transmit the field data to the remote computing system in response to detecting a trigger event. The remote computing system can be configured to receive a polling data request from an industrial data polling system, the polling data request utilizing a polling protocol and transmit at least a portion of the field data to the industrial data polling system as a polling protocol reply.

Each of the one or more field devices can be configured to transmit the field data to the remote computing system only in response to detecting the trigger event.

The field data can be in a first format and the remote computing system can be configured to reformat the field data from the first format to a second format that is different from the first format. The first format can be an agnostic format. The second format can be the polling protocol reply.

The remote computing system can be configured to receive the polling data request via a Modbus application programming interface ("API"); query a device mapping database via the Modbus API to identify a particular field device of the one or more field devices based at least in part on data included in the polling data request; retrieve the at least a portion of the field data via a field device API, the at least a portion of the field data corresponding to the particular field device and being in the first format; reformat, via the field device API and using a Modbus formatting database, the at least a portion of the field data to the second format, the second format being the polling protocol reply; transmit the at least a portion of the field data in the second format to the Modbus API; and transmit the at least a portion of the field data to the industrial data polling system via the Modbus API.

The remote computing system can be configured to receive an updated version of execution logic for the one or more field devices; store the updated version of execution logic at a database operatively connected to the remote computing system; and transmit, to the one or more field devices, a message via a primary TCP/IP network connection between the one or more field devices and the remote computing system. The primary TCP/IP network connection can be primarily configured for the remote computing system to receive field data from the one or more field devices. The field data can be detected by one or more industrial equipment sensors. The message can comprise an indication of the updated version of execution logic. The remote computing system can be configured to establish a secondary TCP/IP network connection with the one or more field devices. The secondary TCP/IP network connection can be configured to operate independently from, and contemporaneously with, the primary TCP/IP network connection. The remote computing system can be configured to transmit, via the secondary TCP/IP network connection, the updated version of execution logic from the database. The updated version of execution logic can be transmitted if a timestamp associated with the updated version of execution logic is more recent than a timestamp associated with a current version of execution logic currently being used by the one or more field devices.

The disclosed technology includes a system comprising a remote computing system comprising (i) a processor and memory and (ii) one or more field devices physically proximate to industrial equipment. Each of the one or more field devices can be configured to obtain field data by monitoring one or more parameters associated with the industrial equipment; and transmit the field data to the remote computing system in response to detecting a trigger event. The remote computing system can be configured to store the field data in cached memory and, in response to receiving a request for the field data, retrieve the stored field data and transmit the stored field data to a third party system.

The third party system can be an industrial data polling system. The request for the field data can comprise a polling data request from the industrial data polling system, and the polling data request can utilize a polling protocol. The remote computing system is can be configured to transmit at least a portion of the field data to the industrial data polling system as a polling protocol reply.

Each of the one or more field devices can be configured to transmit the field data to the remote computing system only in response to detecting the trigger event.

The field data can be in a first format. The remote computing system can be configured to reformat the field data from the first format to a second format that is different from the first format. The second format can be the polling protocol reply.

The remote computing system can be configured to receive the polling data request via a Modbus application programming interface ("API"); query a device mapping database via the Modbus API to identify a particular field device of the one or more field devices based at least in part on data included in the polling data request; and retrieve the at least a portion of the field data via a field device API. The at least a portion of the field data can correspond to the particular field device and can be in the first format. The remote computing system can be configured to reformat, via the field device API and using a Modbus formatting database, the at least a portion of the field data to the second format, the second format being the polling protocol reply; transmit the at least a portion of the field data in the second format to the Modbus API; and transmit the at least a portion of the field data to the industrial data polling system via the Modbus API.

The remote computing system can be configured to receive an updated version of execution logic for the one or more field devices; store the updated version of execution logic at a database operatively connected to the remote computing system; and transmit, to the one or more field devices, a message via a primary TCP/IP network connection between the one or more field devices and the remote computing system. The primary TCP/IP network connection can be primarily configured for the remote computing system to receive field data from the one or more field devices. The field data can be detected by one or more industrial equipment sensors. The message can comprise an indication of the updated version of execution logic. The remote computing system can be configured to establish a secondary TCP/IP network connection with the one or more field devices. The secondary TCP/IP network connection can be configured to operate independently from, and contemporaneously with, the primary TCP/IP network connection. The remote computing system can be configured to transmit, via the secondary TCP/IP network connection, the updated version of execution logic from the database. The updated version of execution logic can be transmitted if a timestamp associated with the updated version of execution logic is more recent than a timestamp associated with a current version of execution logic currently being used by the one or more field devices.

The disclosed technology includes a method comprising receiving field data from a field device that is physically proximate to industrial equipment. The field device can be configured to obtain the field data by monitoring one or more parameters associated with the industrial equipment and transmit the field data to a remote computing system in response to detecting a trigger event. The method can include receiving a polling data request from an industrial data polling system, the polling data request utilizing a polling protocol, and transmitting the field data to the industrial data polling system as a polling protocol reply.

Each of the one or more field devices can be configured to transmit the field data to the remote computing system only in response to detecting the trigger event.

The field data can be in a first format. The method can comprise reformatting the field data from the first format to a second format that is different from the first format. The second format can be the polling protocol reply.

The method can comprise receiving the polling data request via a Modbus application programming interface ("API"); querying a device mapping database via the Modbus API to identify a particular field device of the one or more field devices based at least in part on data included in the polling data request; retrieving the at least a portion of the field data via a field device API, the at least a portion of the field data corresponding to the particular field device and being in the first format; reformatting, via the field device API and using a Modbus formatting database, the at least a portion of the field data to the second format, the second format being the polling protocol reply; transmitting the at least a portion of the field data in the second format to the Modbus API; and transmitting the at least a portion of the field data to the industrial data polling system via the Modbus API.

The method can comprise receiving an updated version of execution logic for the one or more field devices; storing the updated version of execution logic at a database operatively connected to the remote computing system; and transmitting, to the one or more field devices, a message via a primary TCP/IP network connection between the one or more field devices and the remote computing system. The primary TCP/IP network connection can be primarily configured for the remote computing system to receive field data from the one or more field devices. The field data can be detected by one or more industrial equipment sensors. The message can comprise an indication of the updated version of execution logic. The method can comprise establishing a secondary TCP/IP network connection with the one or more field devices. The secondary TCP/IP network connection can be configured to operate independently from, and contemporaneously with, the primary TCP/IP network connection. The method can comprise transmitting, via the secondary TCP/IP network connection, the updated version of execution logic from the database. The updated version of execution logic can be transmitted if a timestamp associated with the updated version of execution logic is more recent than a timestamp associated with a current version of execution logic currently being used by the one or more field devices.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 3B is a screenshot of an example remote platform, in accordance with the disclosed technology.

DETAILED DESCRIPTION

Figure 1:
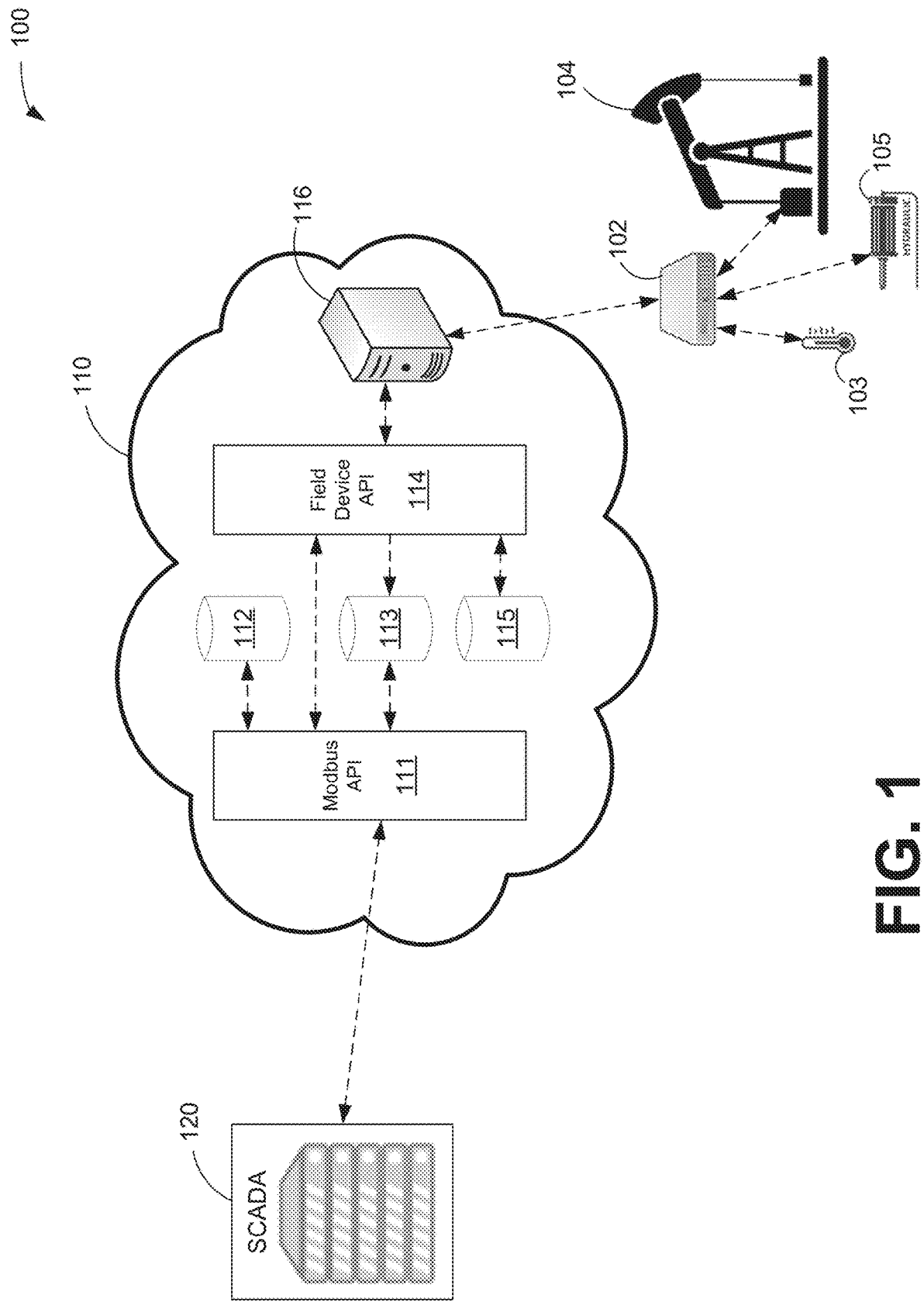
FIG. 1 is a diagram of an example system operational environment, in accordance with the disclosed technology.

For the purpose of promoting an understanding of the principles of the present disclosure, reference will now be made to the examples illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, the disclosed technology generally relates to systems and methods for remotely managing and updating an event-based internet of things ("IoT") device configuration logic in coordination with traditional industrial protocol, and in particular, in coordination with polling protocols used in industrial systems.

The disclosed technology includes a system including a supervisory control and data acquisition ("SCADA") system, a cloud computing environment, and a field device. The field device can be or include one or more IoT devices located at a position physically proximate to industrial equipment. As will be described in more detail herein, the field device can be in communication with the industrial equipment; actuators, valves, or other devices associated with the industrial equipment; and one or more sensors (e.g., a temperature sensor). The cloud computing environment The disclosed systems and methods include updating computer implementable logic at the field device (or generally any device connected to a wireless or wired communications network) to include a most recent or current version of device execution logic based on an update implemented on a web-based or remote platform. For example, the field device can be an electronic computing device operatively connected to industrial equipment, such as oil drilling equipment, power generators, solar panels, trucks, or the like, and furthermore, the field device can monitor information such as location, position, power, key switch status, run status, temperature, pressure, flow levels, or the like, at the industrial equipment. The field device can include one or more sensors to detect and measure conditions at the industrial equipment with which it is integrated. Alternatively or in addition, the field device can be configured to receive data collected by other sensors at the industrial equipment.

The disclosed systems and methods provide a solution for updating computer implementable logic at the field devices. Each field device can include a logic file with computer implementable/executable instructions for processing data received at the field device, as well as instructions for executing general field device tasks. The logic file can include instructions for configuring one or more parameters associated with the industrial equipment monitored by the device. In particular embodiments, the logic file can includes instructions for triggering an action in response to detecting a particular value above or below a predetermined threshold (e.g., the file may include "power down" instructions in response to detecting a heat level above 100 degrees fahrenheit, the file may include "power on" instructions to activate a pump in response to detecting a certain level of fluid or gas that exceeds a predetermined threshold, etc.).

Moreover, industrial control systems are typically configured to use a polling protocol (e.g., a Modbus protocol), such as SCADA systems. As will be understood, each time the SCADA system needs to be updated, the SCADA system, communicating with the field device, transmits a request and receives a reply. This typically occurs once every couple of seconds. Thus, such system configurations use a large amount of data and can strain a network's bandwidth capacity due to the high frequency of polling.

In contrast, the field devices disclosed herein, which have IoT capabilities, can use an event-driven protocol (e.g., "intelligent data push" protocols) in which communications (e.g., over a cellular network) occur only when there is a change in the data in the field (e.g., a change is made to the Logic Table). This event-based configuration can greatly decrease network traffic. However, existing SCADA systems are unable to communicate with such IoT-enabled field devices due to the conflicting protocols used—the polling protocol used by the SCADA system and the event-based protocol used by the field device.

The disclosed technology can provide a cloud-based system and service including a Modbus (or any other polling protocol) application programming interface ("API") configured to communicate with the SCADA system and a field API configured to communicate with the field device. The combination of technologies allows the real-time status of field data to be cached in the cloud computing environment using data-efficient, event-driven communication, and enables the field data to be accessed by a SCADA system using the comparatively data-inefficient Modbus protocol (or other polling protocol). Further, the disclosed technology enables the SCADA system to access the field data and/or to update logic for the field device (which can also be stored in the cloud computing environment) without any development on the SCADA system or even without the SCADA system being aware that the field data was initially collected via event-based data communication methods.

Referring now to the drawings, FIG. 1 is an example system operational environment 100, in accordance with the disclosed technology. As illustrated, the system 100 may include one or more field devices 102 (also referred herein as "IoT monitoring devices," "IoT devices," "monitoring devices," or simply as "devices") located at a position physically proximate to industrial equipment 104. As shown, the industrial equipment 104 is represented as oil drilling equipment, but the field devices 102 may be located at, and operatively connected to or integrated with, any appropriate type of industrial equipment (e.g., power plants, power generators, solar arrays, compressors, transformers, pumps, conveyors, crushers and shredders, power distributors, power quality equipment, irrigation systems, lighting systems, etc.). In various embodiments, the physical distance between the industrial equipment 104 and the devices 102 installed to monitor the same may vary based on system-specific configuration factors such as sensor/device types executing the monitoring of the equipment, specific types of equipment being monitored, operating conditions, network design constraints, or the like. For example, the field devices 102 can be installed within a physical distance of the industrial equipment 104 such that the field devices 102 and one or more sensors 103, actuators 105, or other devices at or near the industrial equipment 104 may be within a range that close enough (e.g., 100 m, 50 m, 30 m, 20 m, 10 m) to communicate within the same wireless network (e.g., a local area network, a mesh network) without additional hardware such as signal repeaters, routers, and other network equipment. Alternatively or in addition, the field devices 102 can be installed at or on the industrial equipment 104 and/or integrated into, or prefabricated to be included in, the industrial equipment 104. Such system configurations can include a single field device 102 receiving data/readings from a plurality of sensors installed at or around a single physical location, or where design constraints require for the system to be "lean," as non-limiting examples.

The field devices 102 at the industrial equipment 104 can be operatively connected over a network to a web-based or remote platform 110 (e.g., a cloud computing environment). A user (e.g., a system administrator) can operate the remote platform 110 via a computing device in communication with the remote platform 110 (e.g., via a web-based graphical user interface). The remote platform 110 can include a server and one or more software applications through which traditional polling protocols can communicate with (e.g., send instructions to, receive data from) the field devices 102 utilizing event-based protocols. As illustrated, the polling protocols can be implemented by a SCADA system 120.

The one or more software applications of the remote platform 110 can include a Modbus API 111 and a Field Device API 114. The Modbus API can be configured to communicate with the SCADA system 120 and provide data to the SCADA system upon receipt of a polling request from the SCADA system 120. The Field Device API 114 can be configured to communicate with the field devices 102 and can request and/or receive event-based data transmissions as discussed more fully herein. The Field Device API 114 can be configured to communicate with the field devices 102 via a computing device 115 configured to communicate with the field devices over a network. The remote platform can include one or more tables or databases, such as Device Mapping Database 112 and/or Modbus Formatting Database 113.

As will be discussed more fully herein, the Modbus API 111 can receive a polling request, which can include a port number and a unit number corresponding to a particular field device 102. The Modbus API 111 can query the Device Mapping Database 112 to determine the unique device identifier associated with the received port number and unit number. The Modbus API 111 then transmits a request to the Field Device API 114 for field data associated with the determined unique device identifier. The Field Device API 114 can retrieve the requested field data from cached memory and transmit the requested field data to the Modbus API 111. The field data retrieved by the Field Device API 114 from the cached memory can be in a first format. The first format can be an agnostic format. The Field Device API 114 can transmit the field data in the first format to the Modbus Formatting Database 113, which can format the requested field data into a second format that is different from the first format, such as a Modbus protocol reply (or other polling protocol reply). The requested field data in the second format can be scaled data or raw data (i.e., not scaled data), and the determination as to whether to scale the requested data or not can be based at least in part on the type of data being requested and/or system configurations/preferences. The reformatted data (e.g., the Modbus protocol reply) can be transmitted to the Modbus API 111, and the Modbus API 111 can then transmit the Modbus protocol reply to the SCADA system 120. Alternatively, the Field Device API 114 can transmit the field data in the first format to the Modbus API 111, the Modbus API 111 can reformat the requested data to the second format via the Modbus Formatting Database 113, and the Modbus API 111 can transmit the requested data in the second format to the SCADA system 120.

As a non-limiting example, the Modbus Formatting Database 113 can comprise one or more Modbus registers, which can serve as the link between the external SCADA system 120 and the field devices 102. That is to say, the Modbus Formatting Database 113 can comprise one or more Modbus registers that include and/or provide the parameters that are set up in the SCADA system 120 and are polled (e.g., by the SCADA system 120) via the Modbus API 111.

Thus, in practice, the Field Device API 114 can retrieve the requested field data from the cached memory and can transmit the requested field data to the Modbus API 111. The Modbus API 111 can format the field data for (or according to) the one or more registers defined by the Modbus Formatting Database 113. For example, the Modbus API 111 can be configured to request one or more particular registers from the Modbus Formatting Database 113 based at least in part on data associated with the retrieved field data (e.g., based on a device number and/or port number indicated by the SCADA system 120, which can correspond to one or more particular field devices 102 and/or data types associated with the one or more particular field devices 102). Stated otherwise, a particular subset of field data (e.g., the field data corresponding to one or more specific field devices) can be mapped to one or more registers (e.g., during an initial commissioning process). Thus, the remote platform 110 can be configured to retrieve field data corresponding to one or more particular field devices 102 based on a requested port number and/or device number (e.g., received from the SCADA system 120) and can ultimately output the requested field data in an appropriate format based at least in part on a comparison of the requested port number and/or device number to the Modbus Formatting Database 113. For example, the Modbus Formatting Database 113 can map an analog input of the SCADA system 120 to a particular register of the Modbus Formatting Database 113; a port number and/or device number of a particular field device 102; a particular parameter, attribute, or unit of measurement corresponding to the data measured/obtained by the field device 102 (e.g., system voltage, pounds per square inch); an indication of whether the outputted data is processed (e.g., scaled via a particular scaling parameter) or raw; and/or a data type (e.g., 16-bit signed integer, 16-bit unsigned integer, 32-bit signed integer, 32-bit unsigned integer, 32-bit float value). As a more specific example, the Modbus Formatting Database 113 can map, via Register 4001 of the Modbus Formatting Database 113, Analog Input (1) of the SCADA system 120 to a System Voltage data output of the field data for a particular field device 102 corresponding to Port Number 502 and/or Unit ID 1, and the corresponding field data can be processed, 16-bit unsigned integer data indicative of a system voltage as measured or otherwise obtained by the particular field device 102.

The remote platform 110 has, to this point, been discussed in detail as including multiple applications, such as a Modbus API 111 and Field Device API 114. This configuration can be advantageous. For example, this configuration can provide security benefits, as the SCADA system 120 cannot directly access data stored in relation to the Field Device API 114. Further, separation of the Modbus API 111 and the Field Device API 114 can facilitate easier troubleshooting and updating of a particular system (e.g., Modbus API 111, Field Device API 114).

Nonetheless, the disclosed technology is not limited to configurations having multiple applications. Alternatively, the remote platform 110 can include a single API that is configured to perform some or all of the functionalities and/or operations described herein with respect to the Modbus API 111 and the Field Device API 114. For example, the single API can be configured to receive polling requests from the SCADA system 120, query the Device Mapping Database 112 to determine the unique device identifier associated with the received port number and unit number, retrieve the requested field data from cached memory, format the requested field data from the first format to the second format (e.g., using the Modbus Formatting Database 113), and transmit the requested data in the second format to the SCADA system 120.

Alternatively or in addition, a user can receive and view field data via an application, such as the Field Device API 114. For example, the remote platform 110 can enable a user to view a real-time status of the industrial equipment 104, adjust operating parameters at the industrial equipment 104, make other actionable changes based on the received data readings, create and edit device configurations, or the like.

The remote platform 110 can be "local" to the field devices 102. For example, the remote platform 110 can be maintained and accessible within the same local area network (or other appropriate wireless network) as the field device(s) 102. Accordingly, the remote platform 110 should not be interpreted as being limited to embodiments in which the platform is strictly a cloud-based platform, or other similar remote design implementations.

The remote platform 110 can include and/or be operatively connected to a logic database 116. The logic database 116 can store a plurality of logic files, and any other appropriate data for supporting the execution of the system processes discussed herein. Each of the plurality of logic files can include computer readable and executable instructions (or other appropriate logic) for controlling the data processing and device execution at each field device 102. The remote platform 110 can store configuration files for each field device 102 within a database other than the logic database 116. Further, the configuration files (e.g., an IOConfiguration.XML file, or the like) for each field device 102 can be stored in one or more separate databases within the remote platform 110, and the configuration files can include the execution logic (e.g., a logic table) for each field device 102. As such, logic for each field device 102 can be stored separately and/or individually within each device 102's respective configuration file, or each device 102's logic may be stored in a centralized database (e.g., logic database 116).

The logic files can be generated by the user at the remote platform 110. For example, the logic files can be generated via a graphical user interface ("GUI") accessible via the remote platform 110, and the GUI may include configurable parameters relating to specific industrial systems and/or equipment components. The GUI can include drop-down menus, text fields, slide-bars, or the like corresponding to particular field device component parameters, thus allowing for the user to easily configure the execution logic for each field device 102. For example, the GUI can allow for a user to configure a particular field device, based on its device identification number, to include logic relating to voltage inputs received by the particular field device. In this example, the user can create logic statements (similar to "if this, then that" statements, or other techniques for creating logic statements) that compare two input values based on a logic operator. Further aspects of the GUI and logic creation are discussed in greater detail below in association with FIGS. 3A and 3B.

Communications between the remote platform 110 and the field devices 102 can be transmitted and received through the network according to TCP/IP protocols. Each field device 102 (or a group of field devices 102) can be associated with a dynamic IP address, and the field devices 102 can continuously transmit data (e.g., encrypted HTTP data, HTTPS data, or other data formatted according to appropriate secure application layer communication protocols) corresponding to the industrial equipment they monitor, therefore allowing users to view the status of the devices and the industrial equipment that they monitor in real-time.

In response to a user updating device logic via the remote platform 110, each field device 102 to which the updated logic pertains can receive a notification from the remote platform 110 regarding the update, as well as instructions for retrieving the updated logic. To retrieve updated logic from the remote platform 110, the field devices 102 can establish a back-channel communication link to the remote platform 110 separate from the communication link transporting data to the devices' respective dynamic IP addresses. For example, communications between the field devices 102 and the remote platform 110 can typically direct data packets to port 443 (for HTTPS web data) or port 80 (for HTTP web data) of the web server included in the network (or remote platform 110) facilitating the communication link; however, the field device 102 can establish a back-channel communication session serviced through port 85 of the web server so that the updated logic can be retrieved from the remote platform 110 without interrupting preexisting communication sessions.

Figure 2:
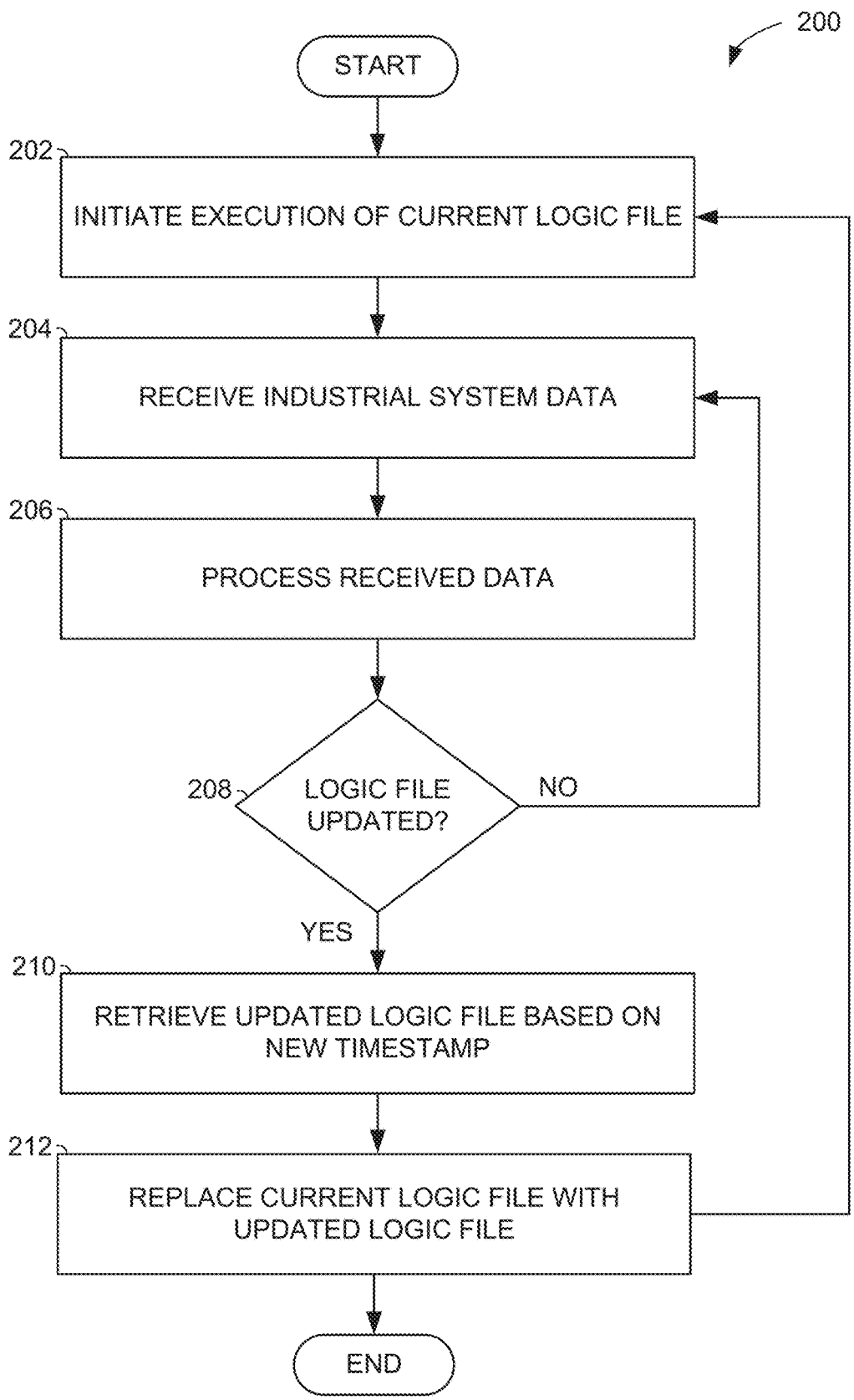
FIG. 2 is a flowchart of an example logic file update process, in accordance with the disclosed technology.

Turning now to FIG. 2, a flowchart of an example logic file update process 200 is shown, in accordance with the disclosed technology. As discussed above, the field devices 102 operatively connected to industrial equipment 104 can locally store and execute a logic file, where the logic file includes executable instructions for controlling, monitoring, and/or managing the industrial equipment 104 and specific configurations associated with the industrial equipment 104. The process 200 can begin at step 202, where the system (e.g., system 100) can initiate execution (or can continue an ongoing execution) of a current logic file at one or more particular field devices (e.g., field device 102). The current logic file can be an XML file, or another appropriate file format. The field devices can include computer hardware such as a processor, memory, wireless (or wired) communication transmitters and receivers, field programmable gate arrays ("FPGAs"), or the like, thus allowing for the field devices to receive, store, and execute the instructions included in the logic file. The field devices can be configured to parse, identify, and extract logic from the XML file and use that logic to process readings received from the industrial equipment. The field devices can include separate logic for converting the XML data (e.g., from the generated logic files) into code and/or instructions executable by the field devices.

Proceeding to step 204, the field device can receive one or more readings or parameters from the industrial systems equipment. As discussed herein, the field devices can be installed at a location physically proximate to the industrial systems equipment, thus allowing for the field devices to receive the one or more parameters from the industrial equipment with minimal latency. A field device can be operatively connected to one or more sensors at the industrial systems equipment and can further operate as a data hub for the one or more sensors. For example, a field device at a power plant can be operatively connected to a plurality of sensors configured to measure a generated power output (e.g., an industrial systems parameter). Continuing with this example, the plurality of sensors can each measure a respective attribute or parameter and can transmit the measured attributes or parameters to the field device, where the field device can proceed to process the received parameters. It should be understood that the field device can be configured to receive any type of parameter, measurement, attribute, or data (digital or analog). For example, the field device can be configured to integrate with industrial systems and industrial equipment such as power generators, solar panels/arrays, compressors, transformers, pumps, conveyors, crushers, shredders, power distributors, power quality equipment, lighting systems, irrigations systems, or the like. In addition to being configured to receive data readings from one or more sensors, the field device can include its own integrated or on-board sensors. For example, the field devices can be equipped with one or more temperature sensors, thus allowing for the field devices to determine if an operational environment becomes too hot or cold. The field devices can also be configured to receive readings (such as power output readings) from other sensors that are operatively connected to the field devices. Further, sensors integrated within the field devices may provide redundancy in important data readings and measurements where sensors separate from the field device may fail, lose network connectivity, lose power, or the like.

At step 206, the system can process the received industrial systems equipment data from step 204. Processing the received industrial systems equipment data can include executing the industrial systems equipment data against the current logic file. Referring to the example discussed above in association with step 204, in which the industrial systems equipment data includes temperature readings from one or more temperature sensors, the logic file stored at the monitoring device can include (in computer memory) executable instructions or similar logic for processing temperature readings. The logic file can include instructions for converting an analog sensor reading into a corresponding digital representation, instructions for converting temperature scales or units of measure (e.g., converting Fahrenheit to Celsius), the instructions for calculating an average temperature or another mathematical/statistical determination from a plurality of received temperatures, or any other appropriate instruction. Continuing with this example, the logic file can include instructions to generate a particular signal (e.g., to turn a connected system on or off) if the average temperature is above or below a predetermined threshold. The logic files can include instructions to modify and perform calculations on the industrial systems equipment data, thus allowing for the remote platform (e.g., remote platform 110) to receive the data from the field devices in a workable format, while also automatically initiating other downstream actions (e.g., turning a connected system off in response to detecting equipment overheating).

At step 208, the system can determine whether an update has been made to the current logic file. As previously mentioned, a user can update the logic file(s) for a particular field device 102 via the remote platform 110. Accordingly, in response to a user updating logic for one or more field devices 102, the remote platform 110 can transmit an alert or notification to the appropriate field devices 102 at which a logic file update is required/available. The alert/notification can include\ a message communicating that a logic update has occurred, and the alert can furthermore include monitoring device instructions for retrieving an updated logic file from the logic database 116 at the remote platform 110. Accordingly, the field devices 102 can be alerted in near real-time when updates are made to their respective logic files. The system may also query the remote platform 110 at predetermined and/or periodic time intervals (e.g., daily, hourly, every minute, etc.) to determine if an update has been made to the current logic file (for example, by comparing logic file timestamps). If, at step 208, the system determines that no logic file update has occurred, the system can return to step 204, where the field devices 102 continue to receive (in real-time) data readings from the industrial equipment. However, if the system determines that a logic file update has occurred, the system can proceed to step 210, where the field device 102 retrieves the updated logic.

At step 210, and as mentioned briefly above, the field devices 102 may retrieve updated logic from the logic files stored at the logic database 116 associated with the remote platform 110. Each logic file corresponding to a field device configuration can include an associated timestamp (e.g., a particular time, day, month, and/or year when the device logic was created and/or last updated). Logic files can include version numbers (e.g., 1.0, 1.1, 2.0, etc.) or another appropriate versioning method for representing changes to device execution logic over time. In response to receiving the alert or notification from the remote platform 110 indicating that an updated logic file is available, each field device 102 to which the updated logic file pertains may retrieve the updated logic file from the plurality of logic files. The field devices 102 can determine which logic file is the updated logic file based on the logic file timestamps. For example, a field device 102 can query its respective configuration file, which can include a logic table representative of the device 102's execution logic, and the field device 102 can further determine if the timestamp associated with the logic table has been updated. In response to determining that the logic table timestamp within the configuration file has been updated, the updated logic table can be downloaded and executed by the appropriate field devices 102. In other examples, a field device 102 can query the remote platform 110 and the plurality of logic files for a logic file with a timestamp more recent than the field device 102's current logic file. The field devices 102 can transmit an API request to the remote platform 110 that requests the most recent logic file without comparing timestamps with the current logic file at the monitoring device. Each logic statement in a logic file can include a respective timestamp, and the field devices 102 can receive alerts regarding new logic statements or updates to existing logic statements. Accordingly, in querying the remote platform 110 for the new or updated logic, the field devices 102 can parse the logic file based on timestamps associated with individual logic statements to determine the individual logic statements usable to replace current logic statements of the field devices 102.

Continuing with step 210, the updated logic, or the entire logic file, can be retrieved over a secure back-channel communication link, which can be independent from other communications being received and transmitted from the field device 102. Each field device 102 can include a dynamic IP address and a TCP/IP connection to the remote platform 110 over which the monitoring device communicates data such as sensor readings and other parameters. In response to a field device 102 receiving an alert regarding a logic file update, the field device 102 can establish a back-channel communication link (e.g., an RX/TX session over port 85, or another appropriate port) that is independent from the communication link associated with the dynamic IP address. Accordingly, the field devices 102 can support more than one simultaneous communication channels for at least communicating real-time industrial equipment data readings, as well as for retrieving updated logic files from the remote system 106.

At step 212, the field device 102 can replace the currently stored logic file with the updated logic file retrieved at step 210. In response to retrieving the updated logic file, the field devices 102 can store the logic in local memory and either overwrite the prior logic file or store the updated logic file as a newer version of the device configuration logic. Accordingly, after storing the updated device logic, the process 200 can return to step 202 where the updated device logic (now the current device logic in response to step 212) is executed.

Figure 3A:
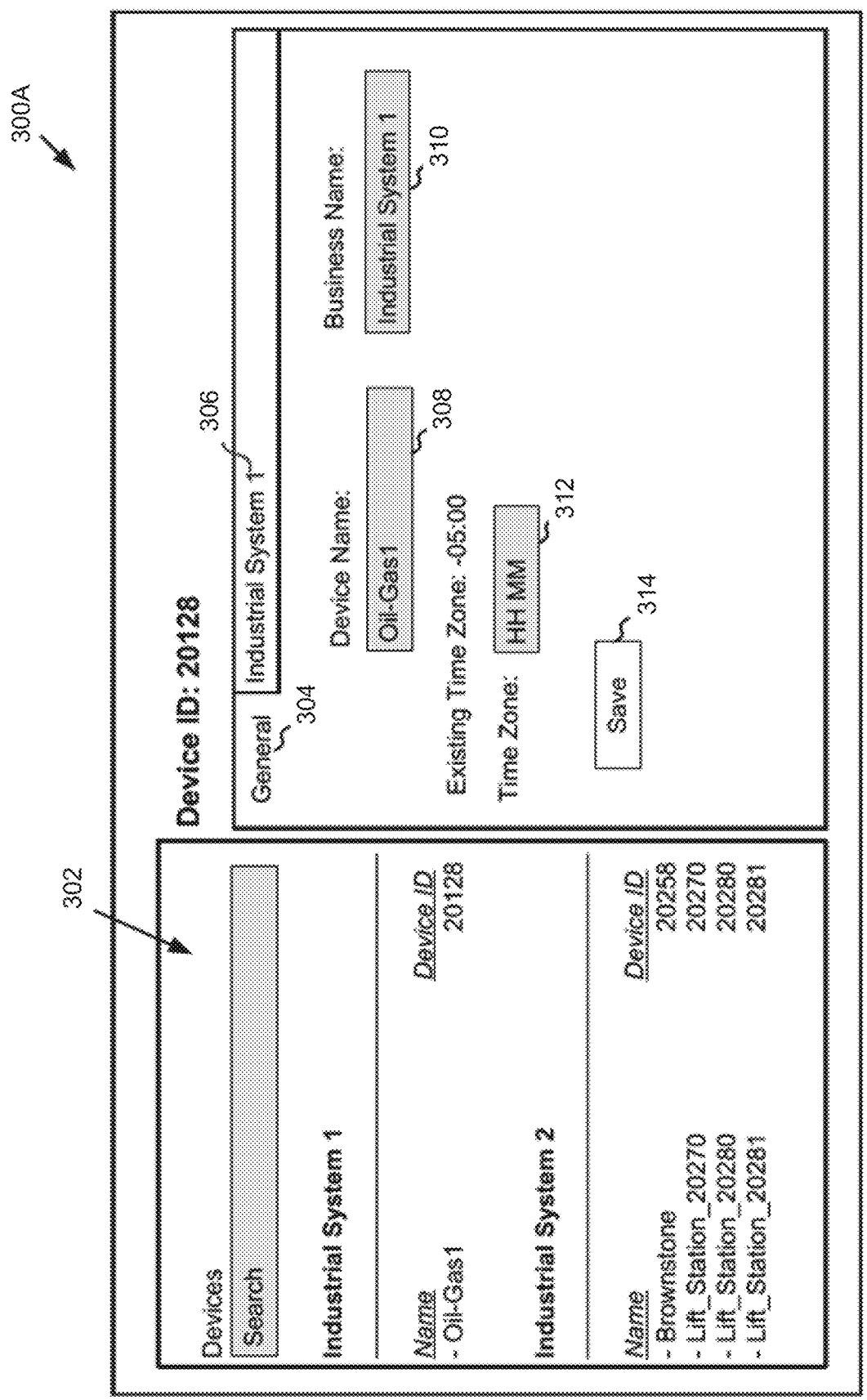
FIG. 3A is a screenshot of an example remote platform, in accordance with the disclosed technology.

Referring to FIG. 3A, a screenshot 300A of a GUI within the remote platform 110 is shown. A user can use the GUI to select a field device from a list 302 of a plurality of field devices operatively connected to the remote platform. The remote platform can display the list of field devices as being located adjacent to the device configuration tabs, and the field devices within the list 302 can be ordered within the list by name, device ID, and a corresponding device location. The user can furthermore configure the selected monitoring device based on available configuration tabs. For example, FIG. 3A illustrates two selectable configuration tabs: General 304 and Industrial System 1 306. The General 304 configuration tab allows for a user to configure device information such as device name 308, business name 310 (or a company, organization, or the like), time zone 312, etc. Furthermore, the monitoring device can include a specific device identification number (as indicated by the Device ID: 20128). By selecting the Save button 314, the configuration information established within the General 304 configuration tab can be saved to the respective field device's configuration file, or another appropriate location in memory.

Turning now to FIG. 3B, a screenshot 300B of a GUI within the remote platform 110 is shown, according to one embodiment of the present disclosure. As discussed in association with the description of FIG. 3A, a user can use the GUI to select a field device from the list 302 of a plurality of monitoring devices operatively connected to the remote platform, and the user can furthermore configure the selected field device based on available configuration tabs. In response to selecting the Industrial System 1 306 configuration tab, the GUI can present the user with the interface in the screenshot 300B. While this screenshot 300B primarily illustrates functionality associated with the logic table 316 configuration tab, the GUI may also enable a user to configure or monitor specific device aspects (e.g., oil and gas device aspects), such as proportional-integral-derivative ("PID") controls and control loops (as indicated by PID control 318 configuration tab), the device outputs (as indicated by outputs 320 configuration tab), and other parameters such as elapsed time or other measurements (as indicated hour meters 322 configuration tab).

The GUI can enable a user to generate and edit logic statements that configure how the field device responds to certain received inputs (e.g., sensor readings from oil and gas industrial equipment). As shown, a logic statement 324 for Device ID: 20128 can include at least an input, a logic operator, an input value, an output, an output value, and a comment that explains the logic statement 324 in human readable terms. For example, and referring particularly to the logic statement 24, in response to performing a logical "Equals" on the Input(N) (e.g., Digital Input(1) value) and the Input Value (e.g., True(0)) (which each may correspond to the digital input received on a particular I/O port associated with the monitoring device 20128, or the input value may be hardcoded), if the Input(N) indeed is equal to the Input Value, then the system is configured to set the Output (M) (e.g., Digital Output(1)) as having the Value "True"). Although not expressly illustrated in the drawings, comments can be added to logic statements defining (in human readable terms) what the logic statement is configured to do. For example, a comment associated with a logic statement can include "turn on a pump if the digital input from a valve sensor is "high" and thus represents an excess amount of fluid in a container." This logic statement 324 can relate to a real-world scenario in which, as a non-limiting example, certain oil and gas equipment includes two sensors that each measure gas or fluid levels. Accordingly, the digital input (1) as shown in the present embodiment can correspond to the I/O port at which data from the sensor is received, and if the data received from the sensor is a logical 1 or "high" (indicative of detected levels of fluid or gas exceeding an predetermined level or threshold), the field device can initiate for the I/O port to which the pump is operatively connected to receive the output value of logical 1, therefore instructing the pump to turn on. Accordingly, the GUI illustrated in the screen shot 300B can enable a user to configure logic statements to be executed at monitoring devices operatively connected to industrial equipment, using logic statements and values available via dropdown menus or the like. For most users, this functionality is easier to understand and implement than ladder logic or a similar programming alternative.

In response to adding or editing logic statements to the device configuration, selecting the save & publish button 326 can finalize the logic statement by mapping the selected inputs and outputs to an XML logic file, or an XML configuration file including a logic table. The XML logic file can include the logic statements in an organized and transportable structure that is understandable by the monitoring devices that in turn execute the logic statements. Further, in response to publishing additions or edits to logic statements associated with one or more monitoring devices, the logic statements (or the device configuration in its entirety) can receive an updated timestamp, and the remote platform can generate and subsequently transmit a notification to the monitoring devices that updated logic is available for retrieval. As discussed above in association with the description of FIG. 2, in response to receiving notification of a logic update, the field devices can establish a back-channel communication link to the remote platform for querying databases/memory at the remote platform for logic files with updated timestamps, and furthermore retrieving any updated logic to replace the current logic executing at the monitoring devices. Selecting the Save button 314 can store the update configuration logic without generating and publishing a notice to the monitoring devices to retrieve the updated logic.

Figure 4A:
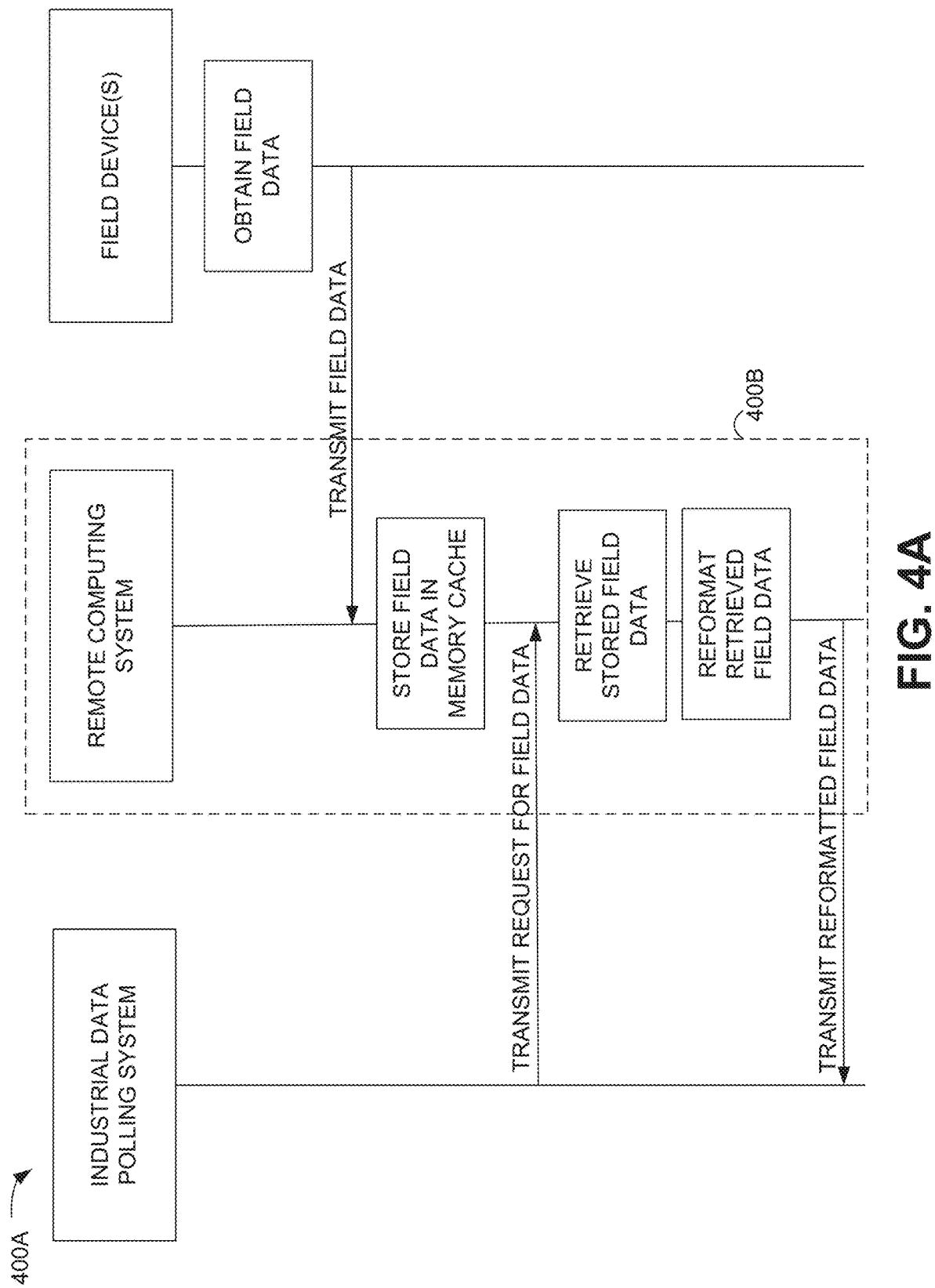
FIG. 4A is a sequence diagram of an example system process, in accordance with the disclosed technology.

Referring now to FIG. 4A, a swim lane diagram is shown, illustrating a data transfer process 400A involving a traditional industrial data polling system (e.g., the SCADA system 120), a remote computing system (e.g., the remote platform 110), field devices (e.g., the field devices 102), and industrial systems (e.g., the industrial equipment 104 at which the field devices 102 are located). The diagram shown in FIG. 4A illustrates several example sub-processes and/or steps occurring at each of the industrial data polling system, the remote computing system, and/or the field devices, over an indefinite time length.

As illustrated, the field device(s) can obtain field data. As discussed herein, the field data can be obtained from various sensors and devices located proximate to, or otherwise in communication with and/or capable of measuring parameters associated with, the industrial systems and/or equipment. The field device(s) can transmit the obtained field data to the remote computing system, and the remote computing system can store the field data in a memory cache.

As briefly mentioned herein, the field device(s) (e.g., field device(s) 102) can employ an event-driven data transmission technique, where the field device(s) transmit or emanate their respective data transmission messages only in response to an "event." Generally, an event can include a status change for the industrial systems of equipment (or a component thereof) (e.g., the industrial system transitions from an active mode to a standby mode), reaching a certain threshold on a signal timer, expiry of a timer (e.g., a timer for monitoring the elapsed time since a data transmission message was last sent), or any other event that may be of use for generating and/or initiating a data transmission message for field data associated with industrial systems and/or equipment. As will be appreciated by those having skill in the art, implementing an event-driven data transmission technique can reduce strain on the network, where otherwise constant or frequent transmission of messages can introduce unnecessary signal traffic within the network and can occupy valuable network bandwidth.

The industrial data polling system can transmit a request to the remote computing system. As described more fully herein, the request can include information identifying one or more particular field device(s) for which field data is being requested (or the request can include information useable by the remote computing system to identify the one or more particular field device(s)). The remote computing system can retrieve the corresponding field data from the memory cache, and the remote computing system can reformat the retrieved field data to a format used or required by the industrial data polling system. For example (and as explained more fully herein), the remote computing system can reformat the field data from an agnostic data format (e.g., as received from the field device(s)) to a polling protocol reply (e.g., a Modbus protocol reply). The remote computing system can transmit the reformatted field data (i.e., the polling protocol reply) to the industrial data polling system. The process 400A can be performed in the order in which the various sub-processes and/or steps were presented in the preceding discussion, but the disclosed technology is not so limited. Stated otherwise, it is contemplated that one or more of the various sub-processes and/or steps discussed with respect to the process 400A can be performed in a different order or omitted entirely.

Figure 4B:
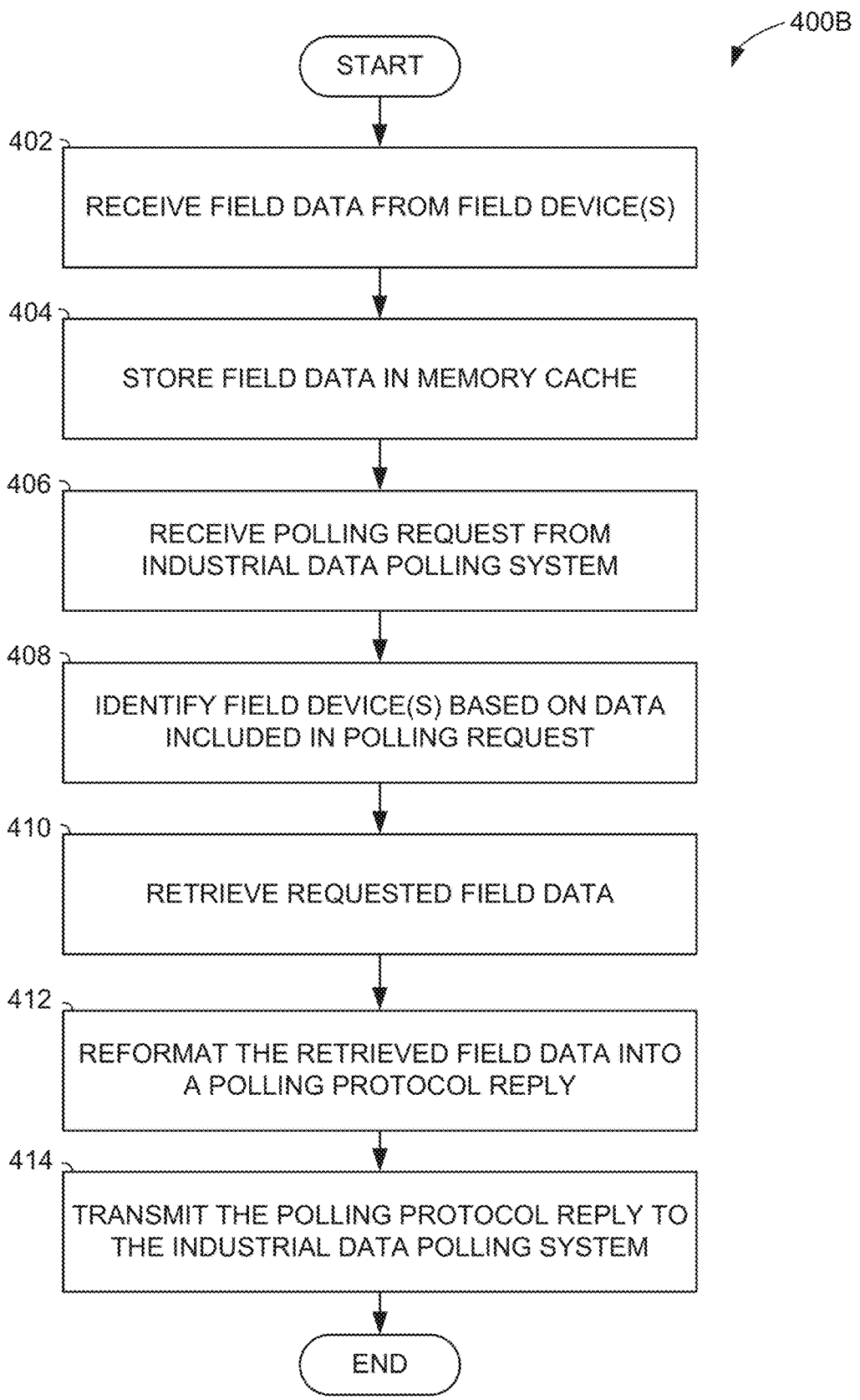
FIG. 4B is a flowchart of an example system, in accordance with the disclosed technology.

Operations performed by the remote computing system are discussed in more detail with reference to a process 400B illustrated by FIG. 4B. As step 402, the remote computing system can receive field data from one or more field devices. The received field data can be in a first format (e.g., an agnostic format). At step 404, the remote computing system store the received field data in a memory cache.

At step 406, the remote computing system can receive a polling request from the industrial data polling system. As a non-limiting example, the remote computing system can include a Modbus API (e.g., Modbus API 111) or another polling protocol API. The Modbus API can receive the polling request. The polling request can include, for example, one or more port numbers and/or one or more unit numbers corresponding to one or more particular field devices. At step 408, the remote computing system (e.g., the Modbus API) can identify the one or more particular field devices. For example, the Modbus API can query a Device Mapping Database (e.g., Device Mapping Database 112) using the one or more port numbers and/or one or more unit numbers to determine the one or more unique device identifiers associated with the particular field device(s).

At step 410, the remote computing system can retrieve the requested field data. For example, the Modbus API can transmit a request to a Field Device API (e.g., Field Device API 114) for the requested field data using, for example, the one or more unique device identifiers that were determined at step 408. In response, the Field Device API can retrieve the requested field data from the cached memory.

At step 412, the remote computing system (e.g., the Field Device API or the Modbus API) can reformat the retrieved field data into a polling protocol reply, which can enable the industrial data polling system to read the requested field data upon receipt. For example, the Field Device API can reformat the retrieved field data from the first data format to a polling protocol data format; the Field Device API can perform the reformatting by using a Modbus Formatting Database (e.g., Modbus Formatting Database 113). As a non-limiting example, the remote computing system (e.g., the Modbus Formatting Database 113) can comprise one or more registers (e.g., Modbus registers), which can serve as the link between the external system (e.g., SCADA system 120) and the field devices. That is to say, the registers can include and/or provide the parameters that are set up in and/or are polled by the external system.

Thus, step 412 can include formatting the retrieved field data (e.g., via the Modbus API 111, via the Field Device API 114) for (or according to) the one or more registers. For example, step 412 can include requesting one or more particular registers (e.g., from the Modbus Formatting Database 113) based at least in part on data associated with the retrieved field data (e.g., based on a device number and/or port number indicated by the SCADA system 120). For example, step 412 can include formatting the retrieved field data based at least in part on the port number and/or device number initially requested or polled (e.g., by the SCADA system 120) and the corresponding stored mappings (e.g., as stored in the Modbus Formatting Database 113).

At step 414, the remote computing system (e.g., the Modbus API) can transmit the polling protocol reply to the industrial data polling system. Alternatively or in addition, the Field Device API can transmit the polling protocol reply (i.e., the reformatted field data) to the Modbus API (e.g., if the reformatting is performed by the Field Device API), and the Modbus API can transmit the polling protocol to the industrial data polling system.

Exemplary Architecture

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of examples of the disclosed technology has been presented only for the purposes of illustration and description and is not intended to be exhaustive or to limit the inventions to the precise forms disclosed. Many modifications and variations are possible in light of the above teaching.

The examples provided herein were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system comprising:
   a remote computing system comprising a processor and memory; and
   one or more field devices physically proximate to industrial equipment, each of the one or more field devices being operatively configured to:
     obtain field data by monitoring one or more parameters associated with the industrial equipment; and
     transmit the field data to the remote computing system in response to detecting a trigger event,
   wherein the remote computing system is operatively configured to:
     receive a polling data request from an industrial data polling system, the polling data request utilizing a polling protocol;
     transmit at least a portion of the field data to the industrial data polling system as a polling protocol reply;
     receive an updated version of execution logic for the one or more field devices;
     store the updated version of execution logic at a database operatively connected to the remote computing system;
     transmit, to the one or more field devices, a message via a primary Transmission Control Protocol/Internet Protocol (TCP/IP) network connection between the one or more field devices and the remote computing system, the primary TCP/IP network connection being primarily configured for the remote computing system to receive field data from the one or more field devices, the field data being detected by one or more industrial equipment sensors, wherein the message comprises an indication of the updated version of execution logic;
     establish a secondary TCP/IP network connection with the one or more field devices, wherein the secondary TCP/IP network connection is configured to operate independently from, and contemporaneously with, the primary TCP/IP network connection; and
     transmit, via the secondary TCP/IP network connection, the updated version of execution logic from the memory, wherein the updated version of execution logic is transmitted if a timestamp associated with the updated version of execution logic is more recent than a timestamp associated with a current version of execution logic currently being used by the one or more field devices.

2. The system of claim 1, wherein each of the one or more field devices is operatively configured to transmit the field data to the remote computing system only in response to detecting the trigger event.

3. The system of claim 1, wherein:
   the field data is in a first format; and
   the remote computing system is operatively configured to reformat the field data from the first format to a second format that is different from the first format.

4. The system of claim 3, wherein the first format is an agnostic format.

5. The system of claim 4, wherein the second format is the polling protocol reply.

6. The system of claim 5, wherein the remote computing system is further operatively configured to:
   receive the polling data request via a Modbus application programming interface ("API");
   query a device mapping database via the Modbus API to identify a particular field device of the one or more field devices based at least in part on data included in the polling data request;
   retrieve the at least a portion of the field data via a field device API, the at least a portion of the field data corresponding to the particular field device and being in the first format;
   reformat, via the field device API and using a Modbus formatting database, the at least a portion of the field data to the second format, the second format being the polling protocol reply;

transmit the at least a portion of the field data in the second format to the Modbus API; and transmit the at least a portion of the field data to the industrial data polling system via the Modbus API.

7. A system comprising:

a remote computing system comprising a processor and memory; and one or more field devices physically proximate to industrial equipment, each of the one or more field devices being operatively configured to:

obtain field data by monitoring one or more parameters associated with the industrial equipment; and transmit the field data to the remote computing system in response to detecting a trigger event, wherein the remote computing system is operatively configured to:

store the field data in cached memory;

in response to receiving a request for the field data, retrieve the stored field data and transmit the stored field data to a third party system;

receive an updated version of execution logic for the one or more field devices;

store the updated version of execution logic at a database operatively connected to the remote computing system;

transmit, to the one or more field devices, a message via a primary Transmission Control Protocol/Internet Protocol (TCP/IP) network connection between the one or more field devices and the remote computing system, the primary TCP/IP network connection being primarily configured for the remote computing system to receive field data from the one or more field devices, the field data being detected by one or more industrial equipment sensors, wherein the message comprises an indication of the updated version of execution logic;

establish a secondary TCP/IP network connection with the one or more field devices, wherein the secondary TCP/IP network connection is configured to operate independently from, and contemporaneously with, the primary TCP/IP network connection; and transmit, via the secondary TCP/IP network connection, the updated version of execution logic from the database, wherein the updated version of execution logic is transmitted if a timestamp associated with the updated version of execution logic is more recent than a timestamp associated with a current version of execution logic currently being used by the one or more field devices.

8. The system of claim 7, wherein:

the third party system is an industrial data polling system;

the request for the field data comprises a polling data request from the industrial data polling system, the polling data request utilizing a polling protocol; and the remote computing system is further operatively configured to transmit at least a portion of the field data to the industrial data polling system as a polling protocol reply.

9. The system of claim 8, wherein each of the one or more field devices is operatively configured to transmit the field data to the remote computing system only in response to detecting the trigger event.

10. The system of claim 8, wherein:

the field data is in a first format; and the remote computing system is operatively configured to reformat the field data from the first format to a second format that is different from the first format.

11. The system of claim 10, wherein the second format is the polling protocol reply.

12. The system of claim 11, wherein the remote computing system is further operatively configured to:

receive the polling data request via a Modbus application programming interface ("API");

query a device mapping database via the Modbus API to identify a particular field device of the one or more field devices based at least in part on data included in the polling data request;

retrieve the at least a portion of the field data via a field device API, the at least a portion of the field data corresponding to the particular field device and being in the first format;

reformat, via the field device API and using a Modbus formatting database, the at least a portion of the field data to the second format, the second format being the polling protocol reply;

transmit the at least a portion of the field data in the second format to the Modbus API; and transmit the at least a portion of the field data to the industrial data polling system via the Modbus API.

13. A method comprising:

receiving field data from a field device that is physically proximate to industrial equipment and is operatively configured to:

obtain the field data by monitoring one or more parameters associated with the industrial equipment; and transmit the field data to a remote computing system in response to detecting a trigger event;

receiving a polling data request from an industrial data polling system, the polling data request utilizing a polling protocol;

transmitting the field data to the industrial data polling system as a polling protocol reply;

receiving an updated version of execution logic for the one or more field devices;

storing the updated version of execution logic at a database operatively connected to the remote computing system;

transmitting, to the one or more field devices, a message via a primary Transmission Control Protocol/Internet Protocol (TCP/IP) network connection between the one or more field devices and the remote computing system, the primary TCP/IP network connection being primarily configured for the remote computing system to receive field data from the one or more field devices, the field data being detected by one or more industrial equipment sensors, wherein the message comprises an indication of the updated version of execution logic;

establishing a secondary TCP/IP network connection with the one or more field devices, wherein the secondary TCP/IP network connection is configured to operate independently from, and contemporaneously with, the primary TCP/IP network connection; and transmitting, via the secondary TCP/IP network connection, the updated version of execution logic from the database, wherein the updated version of execution logic is transmitted if a timestamp associated with the updated version of execution logic is more recent than a timestamp associated with a current version of execution logic currently being used by the one or more field devices.

14. The method of claim 13, wherein each of the one or more field devices is operatively configured to transmit the field data to the remote computing system only in response to detecting the trigger event.

15. The method of claim 13, wherein:
the field data is in a first format; and
the method further comprises reformatting the field data from the first format to a second format that is different from the first format.

16. The method of claim 15, wherein the second format is the polling protocol reply.

17. The method of claim 16 further comprising:
receiving the polling data request via a Modbus application programming interface ("API");
querying a device mapping database via the Modbus API to identify a particular field device of the one or more field devices based at least in part on data included in the polling data request;
retrieving the at least a portion of the field data via a field device API, the at least a portion of the field data corresponding to the particular field device and being in the first format;
reformatting, via the field device API and using a Modbus formatting database, the at least a portion of the field data to the second format, the second format being the polling protocol reply;
transmitting the at least a portion of the field data in the second format to the Modbus API; and
transmitting the at least a portion of the field data to the industrial data polling system via the Modbus API.

* * * * *